United States Patent
Muysewinkel et al.

(10) Patent No.: US 7,047,013 B1
(45) Date of Patent: May 16, 2006

(54) METHOD AND RADIO COMMUNICATIONS SYSTEM FOR CONTROLLING CONNECTIONS FOR CALLS TO AND BY RADIO SUBSCRIBERS

(75) Inventors: Koen Muysewinkel, Rotselaar (BE); Henk Hondeghem, Hamme (BE); Dirk Raeymaekers, Zwijndrecht (BE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 09/646,812

(22) PCT Filed: Mar. 16, 1999

(86) PCT No.: PCT/DE99/00734

§ 371 (c)(1),
(2), (4) Date: Sep. 22, 2000

(87) PCT Pub. No.: WO99/49673

PCT Pub. Date: Sep. 30, 1999

(30) Foreign Application Priority Data

Mar. 24, 1998 (DE) ................................. 198 12 916

(51) Int. Cl.
*H04Q 7/20* (2006.01)
(52) U.S. Cl. ...................... 455/445; 455/436; 455/438; 455/428; 370/328; 370/351
(58) Field of Classification Search ................ 455/445, 455/427, 428, 429, 430, 438, 439, 436, 442, 455/443, 444, 448, 417

See application file for complete search history.

(56) References Cited

U.S. PATENT DOCUMENTS

| 5,081,703 | A  |   | 1/1992 | Lee .............................. 455/13 |
|-----------|----|---|--------|---------------------------------------|
| 5,396,543 | A  | * | 3/1995 | Beeson, Jr. et al. ........... 379/59 |
| 5,790,939 | A  | * | 8/1998 | Malcolm et al. ............ 455/13.2 |
| 6,061,561 | A  | * | 5/2000 | Alanara et al. ............. 455/422 |
| 6,198,921 | B1 | * | 3/2001 | Youssefzadeh et al. ..... 455/428 |
| 6,208,627 | B1 | * | 3/2001 | Menon et al. ............... 370/328 |

FOREIGN PATENT DOCUMENTS

WO WO 95/24789 9/1995

* cited by examiner

*Primary Examiner*—Edward F Urban
*Assistant Examiner*—Thuan T. Nguyen
(74) *Attorney, Agent, or Firm*—Morrison & Foerster LLP

(57) ABSTRACT

Based on a radio communications system (KN) having at least one radio subsystem (RSS) for access by the radio subscribers in an associated radio area (RRA) and having at least one switching center (MSC) for switching through connections, the method and the radio communications system according to the invention provide for the connections between the radio subsystem and the switching center to be routed via a radio transmission unit (UE) in such a way, that, in the case of a call within a radio area between radio subscribers within the same radio area (RRA), or in the case of a call between radio subscribers in different radio areas (RRA, RRA*), only signaling connections (si) are switched through from the radio transmission unit to the switching center, and that traffic channel connections (ni) are switched by the radio transmission unit between a first radio subsystem (RSS) and a second radio subsystem (RSS*) in the case of a call within a radio area from the radio subsystem (RSS) itself or in the case of a call between radio subscribers in different radio areas (RRA, RRA*).

14 Claims, 3 Drawing Sheets

METHOD AND RADIO COMMUNICATIONS SYSTEM FOR CONTROLLING CONNECTIONS FOR CALLS TO AND BY RADIO SUBSCRIBERS

BACKGROUND OF THE INVENTION

The invention relates to a method for connection control during calls from/to radio subscribers in a radio communications system, and to a corresponding radio communications system.

DESCRIPTION OF THE RELATED ART

Radio communications systems are used to supplement or expand existing public or private communications systems. For example, in contrast to public communications systems such as the public telephone network, radio communications systems can at least partially use wire-free communications connections. As is known, such radio communications systems have radio devices which can be combined to form at least one radio subsystem (for linking, without any wires) communications terminals which each allow access by radio subscribers, and switching devices for switching through connections, signaling connections, and traffic channel connections. A radio subsystem can normally be assigned an associated radio area for supervising the radio subscribers moving with their communications terminals in that area. This means that switching centers, radio devices and communications, terminals which are networked to one another in a radio communications system can be connected to one another in a very large number of ways.

Each connection on the basis of an outgoing or incoming call, in which at least one radio subscriber is involved, must normally be routed via the switching center. For certain areas, particularly remote areas—for example islands, mountain valleys, deserts, etc.—which are controlled by a radio subsystem with appropriate radio devices, it may not be economically worthwhile to use and operate a dedicated switching center for each area. The use of the existing telecommunications resources should be optimized for this situation. Furthermore, a significant number of countries have no infrastructure to produce the link between the radio devices and one or more central switching centers in a radio communications system in order to use telecommunications services at a reasonable cost.

WO 95/24789 discloses a method for connection control in a radio communications system, which has transcoder units, at a distance from the base stations, for coding and decoding voice signals. In the case of a call between radio subscribers within a radio area or in the case of a call between radio subscribers in different radio areas, only signaling connections are switched through to the switching center. The traffic channel connections are switched by the radio subsystem itself for the first-mentioned case, and are switched between different radio subsystems for the second-mentioned case.

U.S. Pat. No. 5,081,703 discloses a satellite communications system for rural areas, in which signals received from the satellites are converted by conversion units into signals for a switching center, and vice versa. In this case, the conversion units communicate with mobile stations which are located in predetermined geographical areas.

SUMMARY OF THE INVENTION

One object of the present invention is thus to specify a method and a radio communications system which improves the connection control during calls from/to radio subscribers.

This object is achieved by a method for connection control in a radio communications system during calls from and to radio subscribers, the radio communication system comprising a radio subsystem via which communications terminals which allow access by the radio subscribers can be connected in an associated radio area, and a switching center for switching through connections, comprising the steps of routing the connections between the radio subsystem and the switching center via a radio transmission unit, the step of routing comprising switching through, for a case of a call within a radio area between radio subscribers within a same the radio area, or for a case of a call between radio subscribers in different radio areas, only signaling connections from the radio transmission unit to the switching center, and switching traffic channel connections by the radio transmission unit between a first radio subsystem and a second radio subsystem for a case of a call within a radio area from the radio subsystem itself, or for a case of a call between radio subscribers in different radio areas.

The object of the invention is also achieved by a radio communications system for connection control during calls from and to radio subscribers, comprising communication terminals; a radio subsystem via which the communications terminals which allow access by the radio subscribers can be connected in an associated radio area; a switching center for switching through connections; a radio transmission unit which is arranged between the radio subsystem and the switching center and via which the connections are routed, the routing being implemented so that when a call within a radio area between radio subscribers within a same radio area, or when a call between radio subscribers in different radio areas are made, only signaling connections are switched through from the radio transmission unit to the switching center, and the routing being implemented so that traffic channel connections are switched by the radio transmission unit between a first radio subsystem and a second radio subsystem when a call is made within a radio area from the first radio subsystem or when a call is made between radio subscribers in different radio areas therefor.

Based on a radio communications system having at least one radio subsystem for access by the radio subscribers in an associated radio area and having at least one switching center for switching through connections, the method and the radio communications system according to the invention provide for the connections between the radio subsystem and the switching center to be routed via a radio transmission unit in such a way, that, in the case of a call within a radio area between radio subscribers within the same radio area, or in the case of a call between radio subscribers in different radio areas, only signaling connections are switched through from the radio transmission unit to the switching center, and that traffic channel connections are switched by the radio transmission unit between a first radio subsystem and a second radio subsystem in the case of a call within a radio area from the radio subsystem itself or in the case of a call between radio subscribers in different radio areas.

Since only the signaling connections are switched via the radio transmission unit—preferably in the form of a satellite—to the switching center, while the traffic channel connections are switched either locally in the radio subsystem or in the radio transmission unit, the connection control can be optimized with a dynamic switching capacity—particularly for a remote radio area without its own switching center. It is thus sufficient to equip each such radio area only with radio devices rather than with an oversize switching center, and to provide the through-switching functions of a switching center for traffic channel connections which are to be used as optimally as possible, in the radio subsystem or in the radio transmission unit according to the invention. A further advantage of the subject matter of the invention over a solution in which the traffic channel connections are always switched through as far as the switching center is that, in the case of a call within a radio area, no traffic channel connections whatsoever need be switched in the radio transmission unit, and in the case of a call between radio subscribers in different radio areas, fewer traffic channel connections need be switched in the radio transmission unit—since the switching center is bypassed for both parts of the call connection. In both cases, this result in an increase in capacity with regard to the transmission bandwidth in the radio transmission unit, which is at its greatest when the traffic channel connections with the user information are switched through in the case of a call within a radio area.

According to one advantageous development of the invention, even in the case of a call which relates to a radio subscriber and a subscriber of another communications system, only the signaling connections are switched through from the radio transmission unit to the switching center, while the traffic channel connections between the radio communications system and the other communications system are switched by the radio transmission unit. This additionally results in an increase in capacity in the case of a call in which traffic channel connections from the other communications system, for example, a cable-based public communications network (PLMN), would normally have to be switched to the switching center of the radio communications system but, according to the development, are actually passed on directly from the radio transmission unit to the radio subsystem.

According to another development of the invention, it has been found to be advantageous for control information to be sent back from the switching center via a switched-through signaling connection, on the basis of which control information the radio subsystem and/or the radio transmission unit cause/causes the traffic channel connections. It is thus possible in a simple way for the radio subsystem or the radio transmission unit to use the received control information to decide whether it should or should not switch through the user connections locally.

In this case, it is particularly advantageous if an identifier to identify trunks which are in each case used for the call in the switching center are also sent back from the switching center via a switched-through signaling connection, and on the basis of this identifier, the radio subsystem checks for the presence of a call within a radio area, and causes the switching of the traffic channel connections. The switching center uses this information to inform the radio subsystem in a simple way that the traffic channel connections can be switched through locally, since this is a call within the radio area.

Other developments of the invention provide for the switching of the signaling connections and of the traffic channel connections in the respective radio subsystem to be controlled by interworking units with a through-switching capability, and for the switching of the signaling connections to the switching center to be controlled by further interworking units with a through-switching capability.

It has also been found to be advantageous for the switching of the signaling connections and of the traffic channel connections for the uplink transmission direction from the communications terminal to the radio subsystem to be carried out after carrying out a transcoder and data rate adaptation function, and for the downlink transmission direction from the radio subsystem to the communications terminal to be carried out before carrying out the transcoder and data rate adaptation function in the respective radio subsystem.

BRIEF DESCRIPTION OF THE DRAWINGS

The subject matter of the invention will be explained in more detail in the following text with reference to drawing illustrations

DESCRIPTION OF THE PREFERRED EMBODIMENTS

Figure 1:
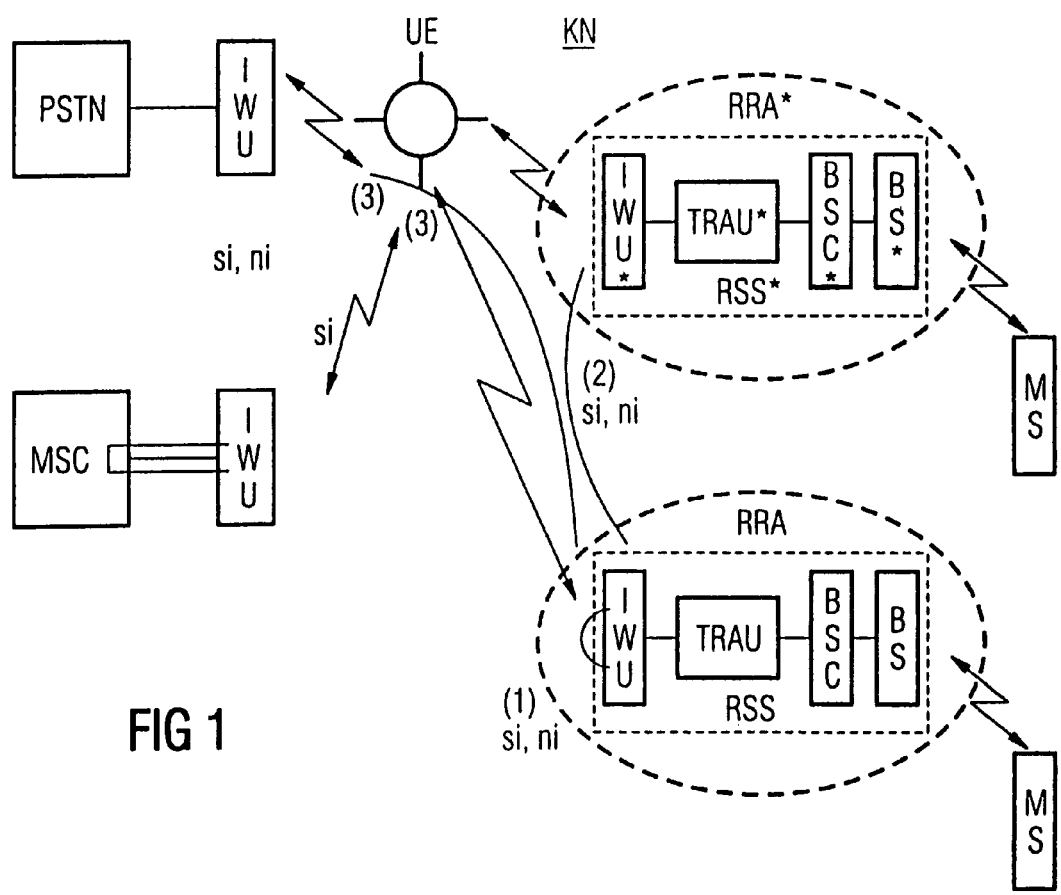
FIG. 1 is a block diagram of a radio communications system.

FIG. 1 shows the block diagram of a radio communications system KN, which normally has a number of radio subsystems to control the radio resources in radio areas in which there are radio subscribers. The chosen example shows two radio subsystems RSS, RSS* for radio coverage of the associated radio areas RRA, RRA* (Remote Radio Area), via which communications terminals—mobile stations MS—which allow access to the radio subscribers, can be connected via a radio interface. Devices in a radio communications system which is operated in accordance with the GSM method have been chosen as examples of the radio devices. However, the invention is not limited to GSM systems and can be used irrespective of the access technology for radio transmission, for example, TDMA (Time Division Multiple Access), FDMA (Frequency Division Access) CDMA (Code Division Multiple Access) the invention may be used in other radio communications systems as well. Furthermore, the radio communications system KN has at least one switching center MSC for switching through connections, that is to say, signaling connections and user channel connections, for calls from/to the radio subscribers. A gateway from the radio communications system KN to another communications system—in the present example to the public telephone network PLMN—is feasible, so that the connections for calls between a subscriber in the other communications system and a radio subscriber in the radio communications system KN can also be controlled according to the subject matter of the invention.

As is known, every radio subsystem RSS, RSS* has a base station BS, BS*, as the device of the opposite end to the mobile stations MS, for communication via the radio interface. A base station controller BSC, BSC* is connected to the base station BS, BS* in order to manage the radio resources—such as radio channel assignment. A transcoder and data rate adaptation unit TRAU, TRAU* is connected to the base station controller BSC, BSC* and is used to match the transmission rate—for example 16 kbit/s—used in the radio subsystem RSS, RSS* and on the radio interface, and the transmission rate—for example, 64 kbit/s—processed in the switching center MSC to one another in both transmission directions (uplink and downlink).

Furthermore, the transcoder and data rate adaptation unit TRAU, TRAU* carries out the task of decompressing the information which was transmitted in compressed form via the radio interface.

In order to produce a link between the radio subsystems RSS, RSS* without a dedicated switching center—in particular/for remote radio areas—and the switching center MSC wherever it is located, a radio transmission unit UE is connected in between. For connection control, this means that, for calls within a radio area (Intra Remote Radio Area call)—see case (1)—which take place between radio subscribers within the same radio area RRA, the user connections ni are switched through locally by the associated radio subsystem RSS. Only the signaling connections si are passed on via the radio transmission unit UE to the switching center MSC. The transmission bandwidth of the radio transmission unit UE, which is preferably in the form of a satellite, is utilized more economically by local through-switching for the user connections ni—which contain the user information in the form of voice and data—since, otherwise, the first partial user connection of the calling radio subscriber and the second partial user connection of the called radio subscriber would have to be passed via the satellite for every call. The local through-switching functions in the radio subsystem RSS are provided in an interworking unit IWU, which is preferably connected to the transcoder and data rate adaptation unit TRAU, or is integrated in it.

During the connection set-up process, the switching center MSC normally assigns transmission channels to the radio subsystem RSS for both radio subscribers. In doing so, it confirms—using known GSM procedures to determine the locations—that both radio subscribers are located in the same radio area RRA. The switching center MSC thus sends an identifier for identification of the respective trunks used for the two connection elements in the switching center MSC, via a signaling connection si to the radio area RRA, on the basis of which the interworking unit IWU of the radio subsystem RSS identity code the presence of the call within a radio area, and initiates internal switching of the traffic channel connections. The signaling connections si are always switched by the radio subsystem RSS via the satellite UE to the switching center MSC. The satellite UE uses the information about the presence of the call within a radio area to identify that it need not provide any transmission channels for the user connections ni.

In the case of a call between radio subscribers who are located in different radio areas RRA, RRA*, (see case (2), connection control is carried out in such a way that the satellite UE once again switches through only the signaling connections si to the switching center MSC, and switches the traffic channel connections ni between the radio subsystem RSS and the radio subsystem RSS*. The through-switching process for the traffic channel connections ni in the satellite UE is assisted by the interworking unit IWU, IWU* assigned to the respective radio subsystem RSS, RSS*. This means that the satellite UE can directly link transmission channels for voice signal transmission which are associated with different radio subsystems RSS, RSS* or radio areas RRA, RRA*, without having to include the switching center MSC (i.e., bypassing the switching center). This leads to an improvement in capacity with regard to the transmission bandwidth of the satellite UE. The signaling connections si for such calls are also always switched from the respective radio subsystem RSS, RSS* via the satellite UE to the switching center MSC.

A further example relating to the saving of bandwidth in the satellite UE is to bypass the switching center MSC for connection control for traffic channel connections ni which need to be switched when calls occur between the radio subscriber and the subscriber in the other communications system PSTN. Only the signaling connections si from the satellite UE to the switching center MSC are switched through in the same way as that described above while, in contrast, the traffic channel connections ni from the satellite UE are switched through directly between the radio subsystem—for example/the radio subsystem RSS—of the radio communication system KN responsible for the radio subscriber, and the communications system PSTN responsible for the other subscriber. The communications system PSTN also has an interworking unit IWU with a through-switching capability to support direct switching of the traffic channel connections ni—see case (3) in FIG. 1.

Figure 2:
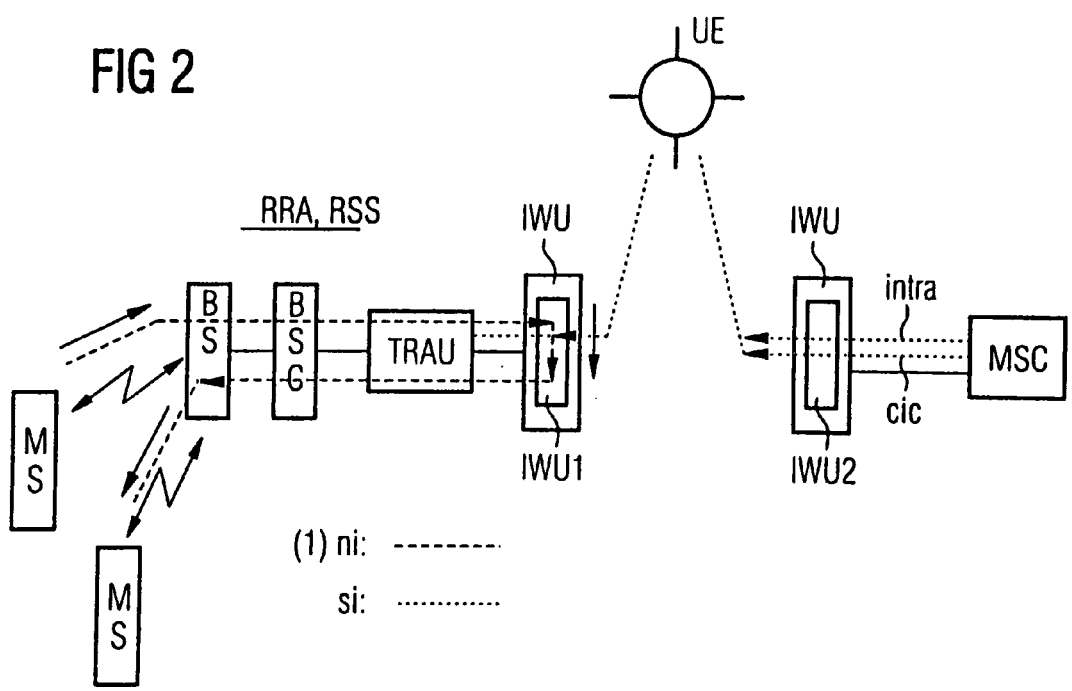
FIG. 2 is a schematic illustration of the connection control process according to the invention for a call within a radio area.

FIG. 2 shows a schematic illustration of the connection control process according to the invention with the devices involved in this process for a call within a radio area, as shown in case (1) in FIG. 1. In this case, the routing of the traffic channel connections ni is shown as a dashed-dotted line, and the routing of the signaling connections si is shown as a dotted line. The call in the radio area RRA is initiated from the mobile station MS of a first radio subscriber, and its destination is a second radio subscriber. The radio subsystem RSS handles the call in accordance with the known GSM procedures. The switching center MSC, which is coupled via the satellite UE to the radio subsystem RSS, likewise uses the known GSM procedures to identify the fact that the called radio subscriber is located in the same radio area RRA. It thus generates the control information intra, via which the presence of the call within the radio area can be checked. Furthermore, the switching center MSC produces an identity code cic (circuit identity code) which identity code the trunks used in the switching center MSC for the radio subscribers involved with the call. Both signaling information items cic, intra are sent from an interworking unit IWU2, which is arranged in the interworking unit IWU in the switching center MSC, via the satellite UE to an interworking unit IWU1 in the interworking unit IWU of the relevant radio subsystem RSS on a signaling connection si.

The interworking unit IWU or the interworking unit IWU1 in the radio subsystem RSS evaluates the received information cic, intra to identify the fact that local through-switching of the traffic channel connections ni is possible, and initiates the through-switching function triggered via the received signaling information. The traffic channel connections ni are thus routed via the interworking unit IWU1 of the interworking unit IWU directly to the radio devices in the radio subsystem—TRAU, BSC and BS—back and from there to the mobile station MS of the called radio subscriber (see the bold arrow).

Figure 3:
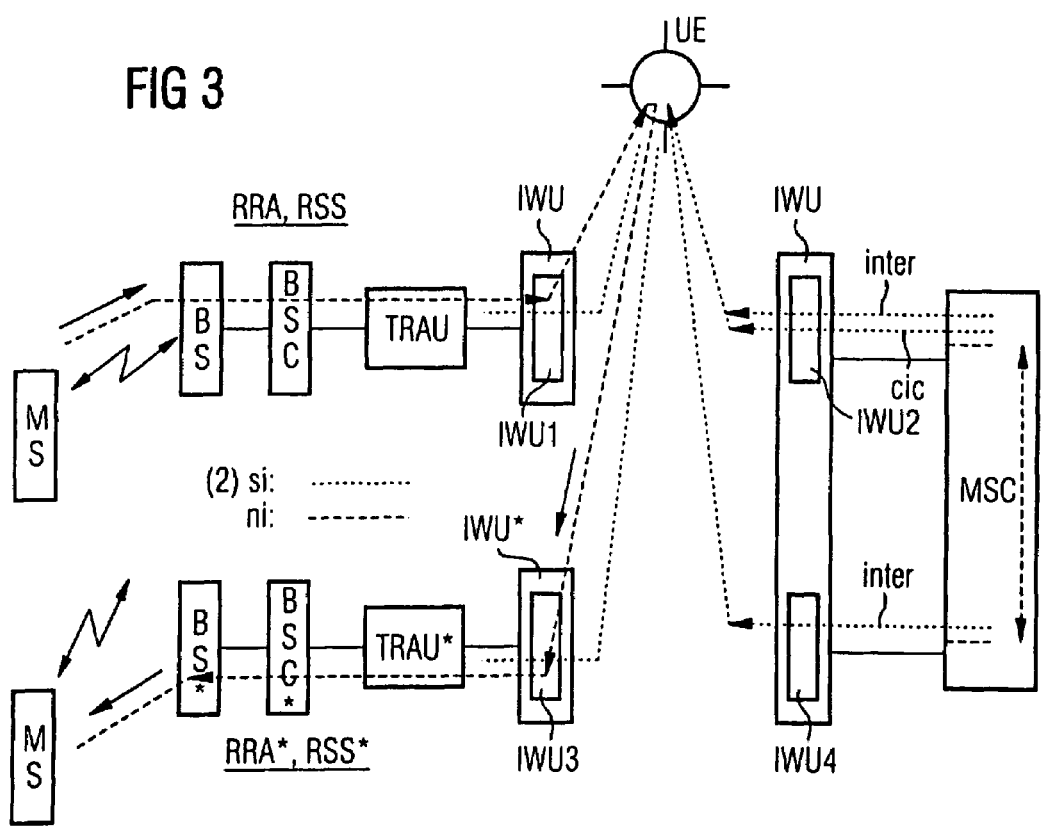
FIG. 3 is a schematic illustration of the connection control process according to the invention for a call between radio subscribers in different radio areas.

FIG. 3 shows a schematic illustration of the connection control process according to the invention with the devices involved in this process for a call between radio subscribers in different radio areas RRA, RRA* as shown in case (2) in FIG. 1. In this case, the routing of the traffic channel connections ni—analogously to the illustration in FIG. 2—is shown as a dashed-dotted line, and the routing of the signaling connections si is shown as a dotted line. The call in the radio area RRA is initiated from the mobile station MS of a first radio subscriber, and its destination is a second radio subscriber. The radio subsystem RSS handles the call in accordance with the known GSM procedures. The switching center MSC, which is coupled to the radio subsystem RSS via the satellite UE, likewise uses the known GSM procedures to identify the fact that the called radio subscriber is located in another radio area RRA*. It thus generates a control information item inter which indicates that the call is taking place between radio subscribers in different radio areas RRA, RRA*. It also receives the identity code cic (circuit identity code) for the trunks used in the switching center MSC. The signaling information is sent from the interworking unit IWU2 via the satellite UE on a signaling connection si and thus to the switching of the traffic channel connections ni in the interworking unit IWU1—bypassing the switching center MSC—to the radio subsystem RSS*. In this subsystem, the interworking unit IWU* has an interworking unit IWU3 which is intended to switch the traffic channel connections ni through for the call. The routing of the traffic channel connections ni from the interworking unit IWU1 to the satellite UE is thus followed by direct connection of the satellite UE to the interworking unit IWU3. The connection is controlled by the interworking unit IWU2. In the radio subsystem RSS*, the interworking unit IWU3 switches the traffic channel connections ni through, so that the user information—primarily voice signals—is passed to the radio devices—TRAU*, BSC* and BS*—and from there to the mobile station MS of the called radio subscriber (see the bold arrows).

In addition to the interworking unit IWU2, the switching center MSC has a further interworking unit IWU4, from which signaling information—such as the control information inter—relating to the radio subscriber located in the radio area RRA* and to the trunks used for the second connection element, can be sent back via the satellite UE. The through-switching process for connection control according to the invention, which switches the traffic channel connections locally in the radio subsystem or directly in the satellite, requires only half the normal bandwidth when each connection element is passed via the switching center MSC.

A procedure analogous to that in FIG. 2 can also be used in case (3) shown in FIG. 1, by the through-switching functions acting directly via the satellite UE on the traffic channel connections between the communications system PSTN and the radio subsystem RSS of the radio communications system KN. This depends on the switching center MSC being linked to the communications system PSTN via a radio transmission device UE, preferably a satellite. In this case as well, the bypassing of the switching center MSC for voice signal transmission leads to an improvement in capacity, since none of the connection elements needs to be switched to the switching center MSC.

The subject matter of the invention means, in particular, that remote radio areas need be equipped only with those radio devices which are then connected only for signaling purposes via a radio transmission device UE to any desired switching center MSC in the radio communications system, and they themselves locally switch the traffic information through, on a traffic-channel basis, or switch it directly via the radio transmission device.

The above-described method and communication system are illustrative of the principles of the present invention. Numerous modifications and adaptions thereof will be readily apparent to those skilled in this art without departing from the spirit and scope of the present invention.

What is claimed is:

1. A method for connection control in a radio communications system during calls from and to radio subscribers, said radio communication system comprising a radio subsystem via which communications terminals which allow access by said radio subscribers can be connected in an associated radio area, and a switching center for switching through connections, comprising:
routing said connections between said radio subsystem and said switching center via a radio transmission unit, said routing comprising:
switching through signaling connections, and not switching through traffic channel connections, from said radio transmission unit to said switching center when a call within a radio area is between radio subscribers within a same said radio area,
switching through signaling connections, and not switching through traffic channel connections, from said radio transmission unit to said switching center when a call is between radio subscribers in different radio areas,
switching traffic channel connections by said radio transmission unit between a first radio subsystem and a second radio subsystem for a case of a call within a radio area from when a call is between radio subscribers in different radio areas.

2. The method as claimed in claim 1, further comprising the step of:
switching through only said signaling connections for a case of a call which relates to a radio subscriber and a subscriber of another communications system from said radio transmission unit to said switching center, and switching said traffic channel connections between said radio communications system and said other communications system by said radio transmission unit.

3. The method as claimed in claim 1, further comprising the step of:
sending back control information from said switching center via a switched-through signaling connection, said radio subsystem or said radio transmission unit initiating said switching of traffic channel connections utilizing said control information.

4. The method as claimed in claim 3, further comprising the step of:
sending an identifier to identify trunks which are in each case used for a call in said switching center back from said switching center via a switched-through signaling connection, said radio subsystem checking, utilizing said identifier, for a presence of a call within a radio area, and causing said switching of said traffic channel connections.

5. The method as claimed in claim 1, further comprising the step of transmitting voice signals on said traffic channel connections.

6. The method as claimed in claim 1, wherein a satellite is used as said radio transmission unit.

7. The method as claimed in claim 1, further comprising the step of:
carrying out a transcoder and data rate adaptation function;
switching said signaling connections and said traffic channel connections for an uplink transmission direction from said communications terminal to said radio subsystem taking place after said step of carrying out a transcoder and data rate adaptation function, and
switching said signaling connections and said traffic channel connection for a downlink transmission direction from said radio subsystem to said communications terminal taking place before said step of carrying out the transcoder and data rate adaptation function in a respective said radio subsystem.

8. The method as claimed in claim 1, further comprising the step of:
controlling said switching of said signaling connections and of said traffic channel connections in said respective radio subsystem by an interworking unit with a through-switching capability.

9. The method as claimed in claim 1, further comprising the step of:
controlling said switching of said signaling connections to said switching center by an interworking unit with a through-switching capability.

10. A radio communications system for connection control during calls from and to radio subscribers, comprising:
communication terminals;
a radio subsystem via which said communications terminals which allow access by the radio subscribers can be connected in an associated radio area;
a switching center for switching through connections;
a radio transmission unit which is arranged between said radio subsystem and said switching center and via which said connections are routed, said routing being implemented so that when a call within a radio area between radio subscribers within a same radio area, or when a call between radio subscribers in different radio areas is made, signaling connections, and not traffic channel connections, are switched through from said radio transmission unit to said switching center, and said routing being implemented so that traffic channel connections are switched by said radio transmission unit between a first radio subsystem and a second radio subsystem when a call is made between radio subscribes in different radio areas.

11. The radio communications system as claimed in claim 10, wherein said radio transmission unit is a satellite.

12. The radio communications system as claimed in claim 10, further comprising an interworking unit for controlling said switching of said signaling connections and of said traffic channel connections in a respective said radio subsystem.

13. The radio communications system as claimed in claim 12, further comprising a transcoder and data rate adaptation unit, which is connected to said interworking unit.

14. The radio communications system as claimed in claim 10, further comprising an interworking unit for controlling switching of said connections in said switching center.

* * * * *